United States Patent [19]

Winnik et al.

[11] Patent Number: 5,286,286
[45] Date of Patent: * Feb. 15, 1994

[54] COLORLESS FAST-DRYING INK COMPOSITIONS FOR PRINTING CONCEALED IMAGES DETECTABLE BY FLUORESCENCE

[75] Inventors: Françoise M. Winnik, Toronto; Anthony R. Davidson, Agincourt; Marcel P. Breton, Mississauga, all of Canada

[73] Assignee: Xerox Corporation, Stamford, Conn.

[*] Notice: The portion of the term of this patent subsequent to Oct. 20, 2009 has been disclaimed.

[21] Appl. No.: 922,882

[22] Filed: Jul. 31, 1992

Related U.S. Application Data

[63] Continuation-in-part of Ser. No. 701,231, May 16, 1991, Pat. No. 5,156,675, which is a continuation-in-part of Ser. No. 834,093, Feb. 12, 1992.

[51] Int. Cl.$^5$ .............................................. C09D 11/02
[52] U.S. Cl. .................................. 106/21 A; 106/22 B; 106/20 D; 106/22 H; 106/22 R
[58] Field of Search .................. 106/21 R, 21 A, 22 B, 106/21, 22

[56] References Cited

U.S. PATENT DOCUMENTS

| | | | |
|---|---|---|---|
| 4,015,131 | 3/1977 | McDonough et al. | 250/461 R |
| 4,021,252 | 5/1977 | Banczak et al. | 106/30 |
| 4,150,997 | 4/1979 | Hayes | 106/15.05 |
| 4,153,593 | 5/1979 | Zabiak et al. | 260/29.6 ME |
| 4,163,001 | 7/1979 | Carumpalos et al. | 260/29.6 MN |
| 4,242,139 | 12/1980 | Tröster | 106/22 |
| 4,243,694 | 1/1981 | Mansukhani | 427/14.1 |
| 4,378,564 | 3/1983 | Cross et al. | 346/75 |
| 4,508,570 | 4/1985 | Fujii et al. | 106/20 |
| 4,740,549 | 4/1988 | Okuzono et al. | 524/379 |
| 4,793,860 | 12/1988 | Murakami et al. | 106/22 |
| 4,836,852 | 6/1989 | Knirsch et al. | 106/22 |
| 4,838,938 | 6/1989 | Tomida et al. | 106/22 |
| 4,847,316 | 7/1989 | Schick et al. | 524/88 |
| 4,889,877 | 12/1989 | Seitz | 523/161 |
| 4,923,515 | 5/1990 | Koike et al. | 106/22 |
| 5,145,518 | 9/1992 | Winnik et al. | 106/21 |
| 5,156,675 | 10/1992 | Breton et al. | 106/22 |

FOREIGN PATENT DOCUMENTS

| | | |
|---|---|---|
| 134041 | 5/1980 | Japan . |
| 165470 | 9/1991 | Japan . |

Primary Examiner—Mark L. Bell
Assistant Examiner—Margaret Einsmann
Attorney, Agent, or Firm—Judith L. Byorick

[57] ABSTRACT

Disclosed is an ink composition consisting essentially of water, diethylene glycol-monobutyl ether, glycerol, an optional cyclohexyl pyrrolidinone component, a dye selected from the group consisting of dyes containing dansyl chromophores and dyes containing porphyrin chromophores, an optional biocide, and an optional polyalkylene oxide/bisphenol-A additive.

18 Claims, 2 Drawing Sheets

COLORLESS FAST-DRYING INK COMPOSITIONS FOR PRINTING CONCEALED IMAGES DETECTABLE BY FLUORESCENCE

This application is a continuation-in-part of copending application U.S. Ser. No. 07/701,231 entitled "Ink For Ink Jet Printing", filed May 16, 1991, now U.S. Pat. No. 5,156,675, and copending application U.S. Ser. No. 07/834,093 entitled "Ink Compositions", filed Feb. 12, 1992, the disclosures of each of which are totally incorporated herein by reference.

BACKGROUND OF THE INVENTION

The present invention is directed to ink compositions and ink jet printing. More specifically, the present invention is directed to ink compositions for ink jet printers. One embodiment of the present invention is directed to an ink composition consisting essentially of water, diethylene glycol-monobutyl ether (butyl carbitol), glycerol, an optional cyclohexyl pyrrolidinone component, a dye selected from the group consisting of dyes containing dansyl chromophores and dyes containing porphyrin chromophores, an optional biocide, and an optional polyalkylene oxide additive.

Ink compositions, especially those for use with ink jet printers, must satisfy a number of conditions in order to achieve acceptable printing.

The ink composition should possess properties which permit it to be jetted appropriately from an ink jet printer. In ink jet printing, droplets of ink are expelled from nozzles onto a recording medium. The ink should form a meniscus at each nozzle prior to being expelled in the form of a droplet. After a droplet is expelled, additional ink surges to the nozzle to reform the meniscus. Important properties of the ink in this context include the ink's viscosity and surface tension.

Generally, adjustment of the viscosity of an ink composition can negatively affect the print quality and/or drying time of the ink. Such adjustment may result in excessive feathering or wicking along the paper fibers as a result of capillary action, and longer drying times at higher viscosity. Adjustments to the surface tension to improve a certain characteristic of the ink may adversely affect other characteristics thereof.

In many applications, fast drying inks are desired. The drying time of an image can limit both the speed and the architecture of an ink jet printer. Faster drying inks allow one to design a faster printer without constraining its architecture. The drying characteristics of the ink should not be such that it dries in the nozzle of the ink jet printer, thus clogging the nozzle. However, slow drying inks have limited use in printers requiring high throughput.

Printing different colored inks next to each other often results in intercolor bleeding with conventional inks. Thus, it would be desirable if inks could be formulated which dried instantaneously to minimize intercolor bleeding. Accordingly, fast drying inks are particularly desirable in conjunction with color ink jet printers.

Drying time and print quality of an ink may be affected by the material on which the ink is applied. For example, paper is often sized with sizing components for the purpose of retarding or preventing penetration of liquids into the structure. Sizing is commonly done by introducing a material to the pulp during the paper making operation. Paper may be sized internally or on the surface. Acid sizing chemicals, such as Mon size available from Monsanto Chemical Company, or alkaline sizing chemicals, such as Hercon-76 available from Hercules Company, are precipitated onto the fibers primarily for the purpose of controlling penetration of liquids into the final dry paper. This process is known as internal sizing. Surface sizing entails the application of dispersions of film-forming substances such as converted starches, gums, and modified polymers to previously formed paper. Surface sizing imparts strength to the paper, and thus high quality printing papers are often surface sized as well. These and other materials tend to affect adversely the manner in which a particular ink dries.

As used herein, the term "plain paper" represents all standard office and xerographic paper except for photographic and thermal paper.

U.S. Pat. No. 4,838,938 (Tomida et al.) discloses a recording liquid comprising a special host molecule with inclusion ability, a dye, a liquid medium, a dispersing agent, a surfactant, a viscosity controller, and a surface tension controller. The liquid medium may comprise water and/or organic solvent. Organic solvents include isopropyl alcohol and N-methyl-2-pyrrolidone. The surfactant may comprise cationic, anionic, or nonionic surfactant. The viscosity controller may comprise polyvinyl alcohol, celluloses, water soluble resins, and the like. The surface tension controller may comprise diethanolamine, triethanol amines, and the like. A preferred viscosity at 25° C. is 5 centipoise or less, more preferably 3 centipoise or less, with a surface tension of 35 to 65 dynes per centimeter.

U.S. Pat. No. 4,923,515 (Koike et al.) discloses an ink composition comprising water, an organic solvent, a dye, surfactants, viscosity controllers, and surface tension controllers. The organic solvents may comprise alkyl alcohols, amides, ketones or ketoalcohols, ethers, alkylene glycols, and the like.

U.S. Pat. No. 4,847,316 (Schick et al.) discloses an ink composition comprising a homogeneous blend of water dispersible polyurethane, water dispersible polyester, and a solvent system containing water or water admixed with a cosolvent. The cosolvent may include diethylene glycol monomethyl ether, diethylene glycol, n-propyl alcohol, diethylene glycol monoethyl ether, diethylene glycol monopropyl ether, and diethylene glycol monobutyl ether. Water comprises at least about 90.0 weight percent of the solvent system.

U.S. Pat. No. 4,150,997 (Hayes) discloses an ink composition for utilization in ink jet printing comprising an aqueous solution of a fluorescent pigment, a dye solubilizer, and butyl carbitol. The fluorescent pigment is a mixture of a dye and an organic resin. The butyl carbitol acts as a dye stabilizer and wetting agent.

U.S. Pat. No. 4,163,001 (Carumpalos et al.) discloses an ink composition comprising a laked alkali stable basic dye wherein the laking agent is dispersed in a liquid medium having butyl carbitol, water, a nonionic surfactant, and an amino alcohol.

U.S. Pat. No. 4,378,564 (Cross et al.) discloses an ink composition comprising water, dye, and glycol ether. The glycol ether may include butyl cellosolve (glycol monobutyl ether), butyl carbitol, and mixtures thereof.

U.S. Pat. No. 4,508,570 (Fujii et al.) discloses an aqueous ink component comprising a water-soluble dye, a polyhydric alcohol and/or an alkyl ether, water, and at least one water-soluble non-ionic surface active agent.

The non-ionic surface active agent may comprise a polyoxyethylene alkyl ether.

U.S. Pat. No. 4,740,549 (Okuzono et al.) discloses a wipe-erasable ink composition for a writing board. The ink composition comprises a dye, an organic solvent, and a non-ionic surface active agent. The nonionic surface active agent may include polyoxyethylene sorbitol monostearate, polyoxyethylene oleyl ether, polyoxyethylene stearyl ether, and the like.

U.S. Pat. No. 4,889,877 (Seitz) discloses a printing ink composition comprising water, a non-volatile diluent, oil-containing microcapsules, a protective colloid blend, and a binder emulsion or alkali soluble resin. The non-volatile diluent may comprise methyl glucoside, dimethyl urea, sorbitol, erythritol, and polyoxyethylene polyols.

U.S. Pat. No. 4,836,852 (Knirsch et al.) discloses an ink composition comprising a dye in a mixture of water and glycol wetting agents. The dye may include solubilizing agents such as N-methyl pyrrolidone and derivatives thereof. A surface tension between 35 and 40 dynes per centimeter is disclosed.

U.S. Pat. No. 4,242,139 (Tröster) discloses water-soluble dyestuffs of the formula in which Y is oxygen or an imino group, $R^1$ and $R^2$ are hydrogen, halogen or lower alkyl or lower alkoxy, n is 1 to 3, and Z is a cation. The dyestuffs are useful for fluorescent inks. The ink can also contain water miscible organic solvents such as glycerol or glycols and additives which are viscosity regulators and/or drying inhibitors, such as natural gums.

U.S. Pat. No. 4,243,694 (Mansukhani) discloses ink compositions suitable for ink jet printing by modulating the density of the applied jet by an electric field in accordance with the information to be recorded on metal, plastic, or paper surfaces, characterized by fluorescent properties in ultraviolet light, incorporating, in solution, a resin component, at least one solvent, proportioned to give the ink properties of heat and steam resistance, the inks being colorless in ordinary light and distinctly fluorescent in ultraviolet light so as to render them particularly suitable as a means for marking various materials whereby marking is normally invisible but easily detectable when subjected to ultraviolet illumination. The ink solvent may include aliphatic alcohol and other solvents which may be ketones, aldehydes, esters, ethers, glycols, glycol ethers, hydrocarbon, and lactones.

U.S. Pat. No. 4,153,593 (Zabiak et al.) discloses an aqueous jet printing ink composition which fluoresces under ultra violet radiation containing a water soluble fluorescent dye dissolved in the water base in an amount up to 2 percent by weight and a water soluble binder component dissolved in the water base in an amount to provide for a specific viscosity which does not exceed 20 centipoise and which preferably includes a fluorescent brightener alone or in combination with fluorescein or one of its salts. A humectant component may be added to the composition, which may include alkylene glycol and alkyl ethers of alkylene glycol.

U.S. Pat. No. 4,015,131 (McDonough et al.) discloses inks wherein the ordinary mixed light color of the ink is a color substantially different than the fluorescent color of the ink. Methods of use include detection of at least the fluorescent wavelength of the ink or detection of both the ink colors when irradiated for fluorescence and by exposure to mixed light.

Japanese Patent document 63-165470 discloses an ink jet ink comprising a water-soluble dye, a mixture of a specific polyhyric alcohol and specific derivatives thereof, a specific surfactant, and water at specific ratios. The polyhydric alcohol derivative is selected from mono, di, and triethylene glycol alkyl ethers and mono, di, and triethylene glycol alcohol ether acetates, such as diethylene glycol monobutyl ether. The polyhydric alcohol is selected from nono, di, tri, and tetrapolyethylene glycol, propylene glycol, and glycerol.

Japanese Abstract 93:134041t discloses water-based jet-printing inks which are fast drying and have good clogging resistance which contain water-soluble dye, a polyol derivative, and a surfactant. An example of an ink is diethylene glycol monobutyl ether, C.I. Acid Blue 22, sodium dodecylbenzenesulfonate, sodium dehydroacetate, and water.

U.S. Pat. No. 4,021,252 (Banczak et al.) discloses an ink composition suitable for ink jet printing on metal surfaces, the ink incorporating, in solution, a colorant, a resin component, an alcohol-water solvent, and optionally an electrolyte, proportioned to give the ink properties of low surface tension, low viscosity, and low resistivity, all these properties, together with the pH of the composition, being controlled to give excellent workability and stability of the ink in ink jet printing operations.

U.S. Pat. No. 4,793,860 (Murakami et al.) discloses an aqueous ink composition comprising a specific dye in an amount of 0.5 to 6.0 weight percent, in which 20 percent or more of the total of the cations of the $-SO_3X$ and $-OX$ groups directly connected to the aromatic rings of the dye are replaced by the Li+ ion or a quaternary ammonium ion, a polyhydric alcohol in an amount of at least 10 weight percent, and water.

Japanese Patent Publication 63-165470 discloses an ink composed of (1) a water-soluble dye, (2) a mixture of (a) a polyhydric alcohol derivative selected from the group of (mono, di, tri) ethylene glycol alkyl ethers and (mono, di, tri) ethylene glycol alcohol ether acetates, such as diethylene glycol monobutyl ether, and (b) a polyhydric alcohol selected from the group of (mono, di, tri, tetra, poly) ethylene glycol, propylene glycol, and glycerol, (3) a surfactant exhibiting a specific surface tension, and (4) water, all in specified amounts. The ink is usable without causing clogging of an ejection nozzle and has excellent quick-dryability and roundness of the printed dot.

U.S. Pat. No. 5,211,747 entitled "Ink Jet Ink Compositions Containing Desizing Agents," discloses an ink composition having a pH of about 5 to about 10 which contains a colorant, a liquid carrier, and less than about 5 percent by weight of a desizing agent. The desizing agent may be (1) poly(oxyalkylene) modified compounds of sorbitan esters, fatty amines, alkanol amides, castor oil, fatty acid, fatty alcohol; (2) hydrophilic poly(dialkyl-siloxanes); (3) fatty imidazolines; (4) fatty ester modified compounds of phosphate, sorbitan, glycerol, poly(ethylene glycol), sulfosuccinic acid, sulfonic acid, alkyl amine; (5) quaternary alkosulfate compounds; (6) poly(propylene oxide)-poly(ethylene oxide) copolymers; (7) poly(alkylene glycol); or (8) mixtures thereof.

Although known compositions and processes are suitable for their intended purposes, a need remains for improved ink compositions. In addition, a need remains for ink compositions exhibiting fast drying times and good print quality. There is also a need for fast drying ink compositions exhibiting high frequency responses. Further, a need exists for ink compositions exhibiting acceptable water fastness properties. Additionally, there is a need for ink compositions suitable for thermal ink jet printing processes which exhibit acceptable latency properties. A need also remains for ink compositions which are substantially colorless under ordinary viewing conditions which enable generation of concealed images. In addition, there is a need for ink compositions and printing processes that enable generation of images which are substantially colorless but detectable when exposed to radiation outside of the visible wavelength range. Further, there is a need for ink compositions that are invisible to the human eye under normal viewing conditions but readable by a sensor, such as an infrared detector or a fluorescence detector, or by the human eye under special viewing conditions such as illumination of the image with ultraviolet light. Additionally, there is a need for ink compositions that can provide a means for placing coded information on a document. There is also a need for ink compositions which exhibit rapid drying times on plain paper. In addition, there is a need for ink compositions which are suitable for annotating xerographic copies with markings not visible to the naked eye via a thermal ink jet printing process.

SUMMARY OF THE INVENTION

It is an object of the present invention to provide improved ink compositions with the above-noted advantages.

It is another object of the present invention to provide ink compositions exhibiting fast drying times and good print quality.

It is yet another object of the present invention to provide fast drying ink compositions exhibiting high frequency responses.

It is still another object of the present invention to provide ink compositions exhibiting acceptable water fastness properties.

Another object of the present invention is to provide ink compositions suitable for thermal ink jet printing processes which exhibit acceptable latency properties.

Yet another object of the present invention is to provide ink compositions which are substantially colorless under ordinary viewing conditions which enable generation of concealed images.

Still another object of the present invention is to provide ink compositions and printing processes that enable generation of images which are substantially colorless but detectable when exposed to radiation outside of the visible wavelength range.

It is another object of the present invention to provide ink compositions that are invisible to the human eye under normal viewing conditions but readable by a sensor, such as an infrared detector or a fluorescence detector, or by the human eye under special viewing conditions such as illumination of the image with ultraviolet light.

It is yet another object of the present invention to provide ink compositions that can provide a means for placing coded information on a document.

It is still another object of the present invention to provide ink compositions which exhibit rapid drying times on plain paper.

Another object of the present invention is to provide ink compositions which are suitable for annotating xerographic copies with markings not visible to the naked eye via a thermal ink jet printing process.

These and other objects of the present invention (or specific embodiments thereof) can be achieved by providing an ink composition consisting essentially of water, diethylene glycol-monobutyl ether (butyl carbitol), glycerol, an optional cyclohexyl pyrrolidinone component, a dye selected from the group consisting of dyes containing dansyl chromophores and dyes containing porphyrin chromophores, an optional biocide, and an optional polyalkylene oxide additive.

DETAILED DESCRIPTION OF THE INVENTION

The present invention provides ink compositions having fast drying times and good print quality. Generally, the ink compositions of the present invention comprise an ink vehicle, such as water or a mixture comprising water and a water soluble or water miscible organic solvent, and a colorant soluble in the ink vehicle. The ink composition may be free of host molecules having inclusion ability.

In a preferred embodiment, the ink compositions of the present invention exhibit a viscosity of from about 1.05 to about 10 centipoise at 25° C., a surface tension of from about 28 to about 35 dynes per centimeter, and a drying time of less than about 1 second on plain paper.

Ink compositions of the invention contain the ingredients therein in any effective relative amounts. Typically, the inks of the present invention contain from about 50 to about 92 percent by weight water and from about 2 to about 40 percent by weight of at least one water miscible cosolvent as the aqueous ink vehicle, from about 0.01 to about 4 percent by weight of the colorant, and from 0 to about 10 percent by weight, preferably from about 5 to about 10 percent by weight, optional additives.

A preferred fast drying ink composition of the invention comprises water, water soluble dye, and from about 2 to about 40 percent by weight, more preferably at least 5 percent, even more preferably from about 10 to about 25 percent by weight, of at least one cosolvent, and has a viscosity of from about 1.6 to about 2.5 centipoise, a surface tension of less than about 40 dynes per centimeter, preferably from about 32 to about 40 dynes per centimeter, and more preferably less than about 35 dynes per centimeter, and a drying time of less than about 1 second on plain paper. (Viscosity values herein are measured at 25.0° C.) More preferably, the ink dries in less than about 0.6 second (normalized to 80 picoliter drop volume) on plain paper, and optimally dries in from about 0.2 to about 0.6 seconds. In one particularly preferred embodiment, the cosolvents lower the drying time without the need for surfactants. The inks preferably have a high frequency response of, for example, $F_{max} > 5$ kHz. $F_{max}$ is the maximum frequency at which the ink jet ink can be jetted from the ink jet printhead.

Frequencies higher than 5 kHz are usually obtained with inks of low viscosity, preferably lower than about 5 centipoise, and preferably lower than about 3 centipoise. In this embodiment, a cosolvent such as diethylene glycol monobutyl ether may be present in a concentration as low as 2 or 3 percent by weight.

It has been observed that the addition of diethylene glycol monobutyl ether (hereinafter "DEG-MBE," also known as butyl carbitol) and glycerol as the cosolvent to ink compositions provides preferable fast drying inks. The addition of DEG-MBE and glycerol allows for an increase in the viscosity of the ink and a decrease in the drying time. In a preferred embodiment, the ink composition may have a viscosity ranging from about 1.45 centipoise to about 2.55 or even 3.0 centipoise, and preferably less than about 2.2 centipoise. Ink compositions having a similar viscosity but not containing DEG-MBE and glycerol have significantly longer drying times. The surface tension of the inks of the invention containing DEG-MBE and glycerol may range from about 28 to about 40 to 45 dynes per centimeter, and preferably range from about 33 to about 40 dynes per centimeter.

DEG-MBE may be present in the ink composition in any effective amount, typically ranging from about 3 to about 40 percent by weight, preferably from about 7 to about 25 percent by weight, although the amount can be outside these ranges. Glycerol may be present in the ink composition in any effective amount, typically ranging from about 3 to about 16 percent by weight, preferably from about 4 to about 10 percent by weight, although the amount can be outside these ranges. Generally, these ink compositions contain from about 50 to about 90 percent by weight of the ink vehicle (sum of water, DEG-MBE, glycerol, and cyclohexyl pyrrolidone), from about 0.01 to about 4 percent by weight of the colorant, and from about 8 to about 25 percent by weight of the combination of diethylene glycol monobutyl ether and glycerol as the cosolvent, and from 0 to about 10 percent by weight of other additives, based on the weight of the total composition, although the amounts can be outside these ranges.

The addition of DEG-MBE and glycerol to an ink composition permits inks which have significantly shorter drying times (less than 1 second), have improved jettability when compared to lower viscosity inks, have minimized intercolor bleeding, and are compatible with dyes used in the ink compositions.

Use of some of the subject cosolvents may permit the present ink compositions to be free of surfactant and still obtain an appropriate surface tension (e.g., 28 to 42 or less than 35 dynes per centimeter).

Other optional additives to inks include biocides such as Dowicil 150, 200, and 75, benzoate salts, sorbate salts, sodium omadine, and the like, present in an amount of from about 0.0001 to about 4 percent by weight, and preferably from about 0.01 to about 2.0 percent by weight, humectants and penetration control additives such as ethylene glycol, diethylene glycol, N-methyl pyrrolidinone, propylene glycol, hydroxyethers, ethers, amides, sulfoxides, ketones, lactones, esters, alcohols, benzyl alcohol, cyclohexylpyrrolidinone, 1,2-hexanediol, 1,2-pentanediol, and the like, present in an amount of from 0 to about 50 percent by weight, and preferably from about 5 to about 40 percent by weight, pH controlling agents such as acids or bases, phosphate salts, carboxylate salts, sulfite salts, amine salts and the like, present in an amount of from 0 to about 1 percent by weight and preferably from about 0.01 to about 1 percent by weight, or the like.

Another preferred additive is a polymeric additive consisting of two polyalkylene oxide chains bound to a central moiety. This additive is of the formula wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkyene oxide polymer is from about 14,000 to about 22,000, and preferably from about 15,000 to about 20,000, although the molecular weight can be outside this range. Materials of this formula are commercially available, such as Carbowax M20, a polyethylene oxide/bisphenol-A polymer of the above formula with a molecular weight of about 18,000, available from Union Carbide Corporation, Danbury, Conn. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science-Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing polymeric additives of this formula are disclosed in U.S. Pat. No. 5,207,825, the disclosure of which is totally incorporated herein by reference.

The ink compositions of the present invention contain no visible colorants, and contain a dye which is substantially colorless but detectable when exposed to radiation outside of the visible wavelength range. The "invisible" inks exhibit rapid drying times when jetted onto typical office papers, and are particularly suitable for fast printing applications, such as those related to applying invisible codes on documents. Inks of the present invention that are substantially colorless and detectable when exposed to radiation outside the visible wavelength range are also useful in processes wherein it is desired to place invisible markings on documents; examples of such situations include providing security markings to control the number of copies made of a document, providing invisible markings that can be detected by an imaging device and that provide instructions to the imaging device (such as instructions not to copy certain portions of the document or to alter the color of certain portions of the document), identifying the machine with which the original document was made, or the like. In addition, the ability to print images which are machine-readable but invisible to the eye under normal viewing conditions can be employed in the area of security printing as well as a means of encoding documents. Invisible "bar-codes" can be printed on a document for purposes such as controlling the integrity of a printing job set or monitoring downstream functional operations. Examples of apparatuses and processes in which inks containing dyes that are detectable in a wavelength range outside the visible range are disclosed in U.S. Pat. No. 5,225,900, the disclosure of which is totally incorporated herein by reference.

In this embodiment of the present invention, a preferred ink composition is one consisting essentially of water, diethylene glycolmonobutyl ether (butyl carbitol), glycerol, cyclohexyl pyrrolidinone, a dye selected from the group consisting of dyes containing dansyl chromophores and dyes containing porphyrin chromophores, an optional biocide, and an optional polyethylene oxide/bisphenol-A additive. These specific compositions consist of a specific combination of components that are highly mutually compatible and enable extremely fast drying of invisible images. The dye compositions are particularly compatible with the specific solvent components in the ink and exhibit a wide spectral range, quantum efficiency of dye emission, and intensity of absorption at the excitation wavelength.

Inks of this specific embodiment contain the ingredients in any effective amounts. Typically, water is present in an amount of from about 40 to about 96 percent by weight, preferably from about 65 to about 90 percent by weight, diethylene glycol-monobutyl ether (butyl carbitol) is present in an amount of from about 4 to about 15 percent by weight, preferably from about 6 to about 12 percent by weight, glycerol is present in an amount of from about 2 to about 12 percent by weight, preferably from about 2 to about 8 percent by weight, cyclohexyl pyrrolidinone is present in an amount of from about 0.1 to about 10 percent by weight, preferably from about 1 to about 5 percent by weight, and the dye is present in an amount of from about 0.01 to about 4 percent by weight, preferably from about 0.01 to about 2 percent by weight, although the amounts can be outside of these ranges.

Specific examples of suitable dyes include those with a porphyrin chromophore, such as 5,10,15,20-tetrakis-(1-methyl-4-pyridyl)-21H,23H-porphine tetra-p-tosylate salt, available form Aldrich Chemical Corporation, 5,10,15,20-tetrakis-(1-methyl-4-pyridyl)-21H,23H-porphine tetrachloride salt, 5,10,15,20-tetrakis-(1-methyl-4-pyridyl)-21H,23H-porphine tetrabromide salt, 5,10,15,20-tetrakis-(1-methyl-4-pyridyl)-21H,23H-porphine tetra-acetate salt, 5,10,15,20-tetrakis-(1-methyl-4-pyridyl)-21H,23H-porphine tetra-perchlorate salt, 5,10,15,20-tetrakis-(1-methyl-4-pyridyl)-21H,23H-porphine tetrafluoroborate salt, 5,10,15,20-tetrakis-(1-methyl-4-pyridyl)-21H,23H-porphine tetra-perchlorate salt, 5,10,15,20-tetrakis-(1-methyl-4-pyridyl)-21H,23H-porphine tetra-triflate salt, 5,10,15,20-tetrakis-(1-hydroxymethyl-4-pyridyl)-21H,23H-porphine tetra-p-tosylate salt, 5,10,15,20-tetrakis-[1-(2-hydroxyethyl)-4-pyridyl]-21H,23H-porphine tetrachloride salt, prepared as described, for example, by V. N. Madakyan in *Chemistry of Heterocyclic Compounds*, 1986, pages 167 to 171, the disclosure of which is totally incorporated herein by reference, 5,10,15,20-tetrakis-[1-(3-hydroxypropyl)-4-pyridyl]-21H,23H-porphine tetra-p-tosylate salt, 5,10,15,20-tetrakis-[1-(2-hydroxypropyl)-4-pyridyl]-21H,23H-porphine tetra-p-tosylate salt, 5,10,15,20-tetrakis-[1-(2-hydroxyethoxyethyl)-4-pyridyl]-21H,23H-porphine tetra-p-tosylate salt, 5,10,15,20-tetrakis-[1-(2-hydroxyethoxypropyl)-4-pyridyl]-21H,23H-porphine tetra-p-tosylate salt, 5,10,15,20-tetrakis-[4-(trimethylammonio)phenyl]-21H,23H-porphine tetra-p-tosylate salt, available from Aldrich Chemical Corporation, 5,10,15,20-tetrakis-[4-(trimethylammonio)phenyl]-21H,23H-porphine tetrachloride salt, 5,10,15,20-tetrakis-[4-(trimethylammonio)phenyl]-21H,23H-porphine tetrabromide salt, 5,10,15,20-tetrakis-[4-(trimethylammonio)phenyl]-21H,23H-porphine tetra-acetate salt, 5,10,15,20-tetrakis-[4-(trimethylammonio)phenyl]-21H,23H-porphine tetra-perchlorate salt, 5,10,15,20-tetrakis-[4-(trimethylammonio)phenyl]-21H,23H-porphine tetrafluoroborate salt, 5,10,15,20-tetrakis-[4-(trimethylammonio)phenyl]-21H,23H-porphine tetra-triflate salt, meso-(N-methyl-X-pyridinium)$_n$(phenyl)4-n-21H,23H-porphine tetra-p-tosylate salt, where n is an integer of value 0, 1, 2, or 3, and where X=4-(para), 3-(meta), or 2-(ortho) and refers to the position of the nitrogen in the pyridinium substituent, prepared as described, for example, by M. A. Sari et al. in *Biochemistry*, 1990, 29, 4205 to 4215, the disclosure of which is totally incorporated herein by reference, meso-tetrakis-[o-(N-methylnicotinamido)phenyl]-21H,23H-porphine tetra-methyl sulfonate salt, prepared as described, for example, by G. M. Miskelly et al. in *Inorganic Chemistry*, 1988, 27, 3773 to 3781, the disclosure of which is totally incorporated herein by reference, 5,10,15,20-tetrakis-(2-sulfonatoethyl-4-pyridyl)-21H,23H-porphine chloride salt, prepared as described by S. Igarashi and T. Yotsuyanagi in *Chemistry Letters*, 1984, 1871, the disclosure of which is totally incorporated herein by reference, 5,10,15,20-tetrakis-(carboxymethyl-4-pyridyl)-21H,23H-porphine chloride salt, 5,10,15,20-tetrakis-(carboxyethyl-4-pyridyl)-21H,23H-porphine chloride salt, 5,10,15,20-tetrakis-(carboxyethyl-4-pyridyl)-21H,23H-porphine bromide salt, 5,10,15,20-tetrakis-(carboxylate-4-pyridyl)-21H,23H-porphine bromide salt, prepared as described by D. P. Arnold in *Australian Journal of Chemistry*, 1989, 42, 2265 to 2274, the disclosure of which is totally incorporated herein by reference, 2,3,7,8,12,13,17,18-octa-(2-hydroxyethyl)-21H-23H-porphine, 2,3,7,8,12,13,17,18-octa-(2-hydroxyethoxyethyl)-21H-23H-porphine, 2,3,7,8,12,13,17,18-octa-(2-aminoethyl)-21H-23H-porphine, 2,3,7,8,12,13,17,18-octa-(2-hydroxyethoxypropyl)-21H-23H-porphine, and the like, as well as mixtures thereof. Also suitable are dansyl dyes, including dansyl-L-alanine, Dansyl-L-α-amino-n-butyric acid, α-dansyl-L-arginine, dansyl-L-asparagine, dansyl-L-aspartic acid, dansyl-L-cysteic acid, N,N'-di-dansyl-L-cystine, dansyl-L-glutamic acid, dansyl-L-glutamine, N-dansyl-trans-4-hydroxy-L-proline, dansyl-L-isoleucine, dansyl-L-leucine, di-dansyl-L-lysine, N-ε-dansyl-L-lysine, dansyl-L-methionine, dansyl-L-norvaline, dansyl-L-phenylalanine, dansyl-L-proline, N-dansyl-L-serine, N-dansyl-L-threonine, Nα-dansyl-L-tryptophan, N,O-di-dansyl-L-tyrosine monocyclohexylammonium salt, dansyl-L-valine, dansyl-γ-amino-n-butyric acid, dansyl-DL-α-amino-n-butyric acid, dansyl-DL-aspartic acid, dansyl-DL-glutamic acid, dansylglycine, dansyl-DL-leucine, dansyl-DL-methionine, dansyl-DL-norleucine, dansyl-DL-norvaline, dansyl-DL-phenylalanine, dansylsarcosine, N-dansyl-DL-serine, N-dansyl-DL-threonine, Nα-dansyl-DL-tryptophan, dansyl-DL-valine, dansyl-DL-α-aminocaprylic acid cyclohexylamine salt, (dansylaminoethyl)trimethylammonium perchlorate, didansylcadaverine, monodansylcadaverine, dansylputrescine, dansylspermidine, didansyl-1,4-diaminobutane, didansyl-1,3-diamino-propane, didansylhistamine, all available from Sigma Chemical Corp., St. Louis, Mo., and the like, as well as mixtures thereof.

Inks can be prepared by any process suitable for preparing aqueous-based inks. For example, the ink ingredients can be mixed in the desired amounts and stirred until a uniform ink composition results (typically about 30 minutes or more, preferably about 2 hours at about 25° C., although the mixing/stirring time can be either greater or less than this time). While not required, the ink ingredients can be heated during mixing if desired. Subsequent to mixing and stirring, the ink composition generally is filtered, preferably with a 0.5 micron filter, to remove any solid or particulate matter. Any other suitable processes for preparing inks can also be employed.

The ink compositions of the invention can be used in ink jet printing systems, particularly thermal ink jet printing systems. Inks generally used in an ink jet printing system preferably are capable of being utilized without clogging or leaking in either the type of printing system which uses thermal energy to produce a vapor bubble in an ink-filled channel to expel a drop of ink, or the type of system which uses a piezoelectric transducer to produce a pressure pulse that expels droplets from a nozzle. One specific embodiment of the present invention is directed to a process which comprises incorporating into an ink jet printer an ink composition of the present invention and causing droplets of the ink composition to be ejected in an imagewise pattern onto a substrate. Ink jet printing processes are well known, and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions with the indicated ingredients in the indicated amounts were prepared by simple mixing of the ingredients at room temperature followed by adjustment of the pH (8.0<pH<9.0) by addition of 1 Molar sodium hydroxide or 1 Molar hydrochloric acid and filtering the ink through a 0.45 micron filter.

Ink A: 0.15 grams of Dansyl-Lysine dye (obtained from Sigma Chemical Co., St. Louis, Mo.); 34.7 grams of a solution containing 58.14 parts by weight water, 1.40 parts by weight cyclohexyl pyrrolidinone, 5.88 parts by weight butyl carbitol, 3.94 parts by weight glycerol, 0.0229 parts by weight polyethylene oxide/bisphenol-A having a molecular weight of 18,500 (obtained from Polysciences, Warrington, Pa.), and 0.0358 parts by weight of a biocide (Dowicil-200, obtained from Chemroy Canada, Inc., Mississauga, Ontario).

Ink B: 0.3 grams of Dansyl-Lysine dye (obtained from Sigma Chemicals); 34.7 grams of a solution containing 58.14 parts by weight water, 1.40 parts by weight cyclohexyl pyrrolidinone, 5.88 parts by weight butyl carbitol, 3.94 parts by weight glycerol, 0.0229 parts by weight polyethylene oxide/bisphenol-A having a molecular weight of 18,500, and 0.0358 parts by weight of a biocide (Dowicil-200).

Ink C: 0.87 milliliters of a solution containing water and 5,10,15,20-tetrakis(1-methyl-4-pyridyl)-21H,23H-porphine, tetra-p-tosylate salt (obtained from Aldrich Chemical Corp., Milwaukee, Wis.), wherein the dye was present in the water in a concentration of 6.15 milligrams dye per 10 milliliters of water; 6.6 grams of a solution containing 195.52 parts by weight water, 5.0 parts by weight cyclohexyl pyrrolidinone, 21.0 parts by weight butyl carbitol, 14.0 parts by weight glycerol, 0.0811 parts by weight polyethylene oxide/bisphenol-A having a molecular weight of 18,500, and 0.127 parts by weight biocide (Dowicil-200).

Ink D: 0.70 milliliters of a solution containing water and 5,10,15,20-tetrakis[4-(trimethylammonio)phenyl]-21H,23H-porphine, tetra-p-tosylate salt (obtained from Aldrich Chemical Corp.), wherein the dye was present in the water in a concentration of 5.67 milligrams dye per 10 milliliters of water; 6.6 grams of a solution containing 195.52 parts by weight water, 5.0 parts by weight cyclohexyl pyrrolidinone, 21.0 parts by weight butyl carbitol, 14.0 parts by weight glycerol, 0.0811 parts by weight polyethylene oxide/bisphenol-A having a molecular weight of 18,500, and 0.127 parts by weight biocide (Dowicil-200).

Figure 1:
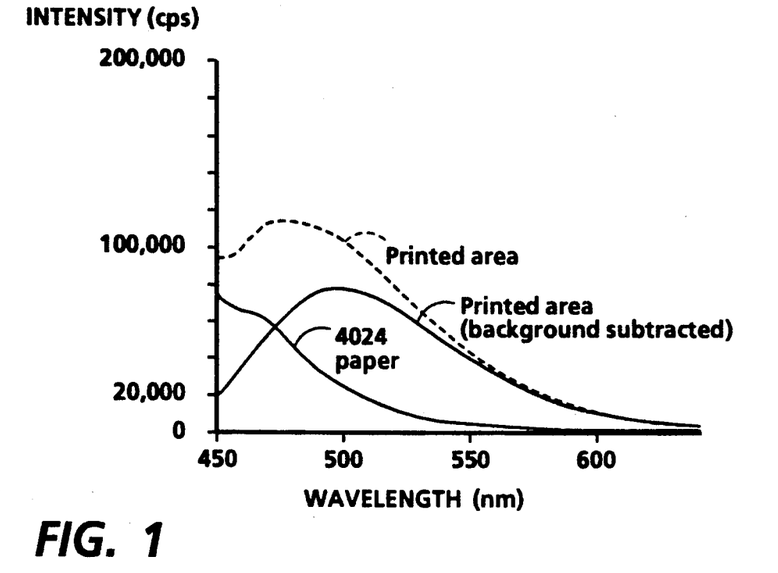
Figure 2:
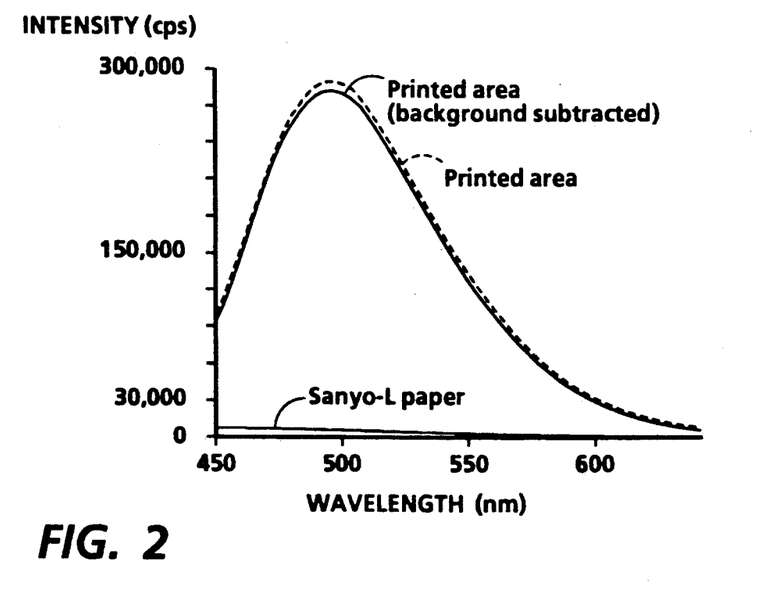
Figure 3:
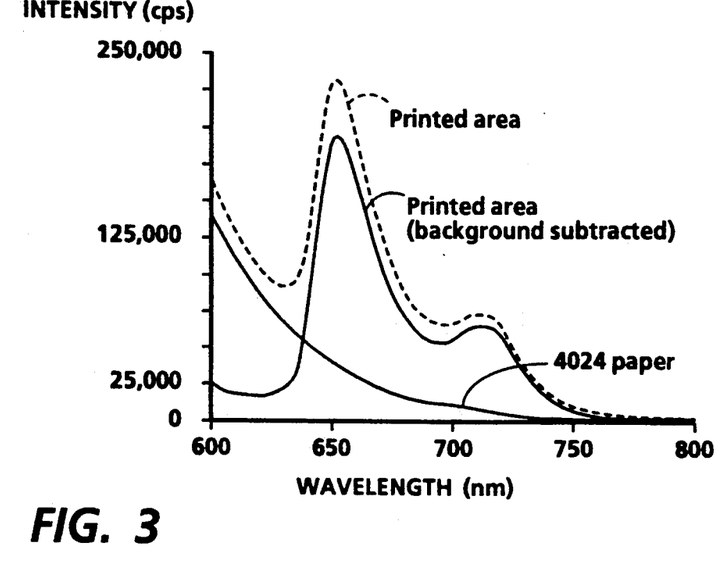
Figure 4:
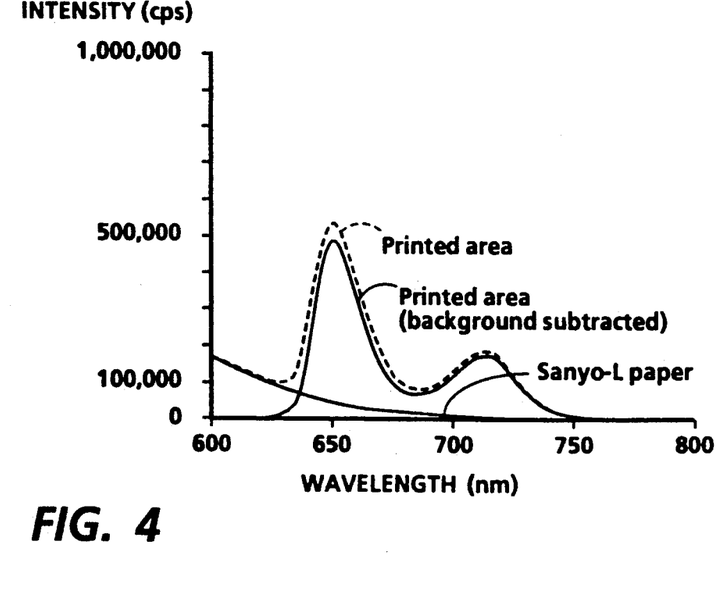

Each of these inks was incorporated into a Hewlett-Packard Desk-Jet 500 ink jet printer and prints were generated on Xerox® 4024 paper (#2, wire side) and on Sanyo-L paper (wire side). Patterns exhibiting both solid areas and printed areas were generated. Fluorescence from the solid areas was measured with a SPEX 212 Fluorolog spectrometer; spectra were obtained in the front face geometry for the blank papers and solid printed areas on both papers. Shown in FIGS. 1 and 2 are the spectra obtained with Ink A on 4024 paper and Sanyo-L paper, respectively, and shown in FIGS. 3 and 4 are the spectra obtained with Ink D on 4024 paper and Sanyo-L paper, respectively.

Each of the inks was also subjected to a drying time test. Drying time was estimated by dropping a given volume of ink onto paper and measuring the time needed for the ink droplet to absorb on the paper. To keep absorption times in the vicinity of about 3 minutes, measurements were performed with an ink volume of 20 microliters. The 20 microliter quantity of ink was deposited onto the paper while the paper was suspended in air, followed by measuring the drying time. Results were then normalized to an ink volume of 100 picoliters (a typical volume for droplets of ink jetted onto paper in an ink jet printing process). The relationship between volume and dry time is linear; normalization entails converting the ink volume (i.e., 20 microliters) to picoliters (i.e., $20 \times 10^6$ picoliters) and then dividing the drying time observed for the 20 microliter volume by the number by which one would divide $20 \times 10^6$ to obtain 100 (i.e., 200,000). The results are shown in the table below:

| Ink | Drying Time (seconds)[a] |
| --- | --- |
| A | $0.71 \pm 0.10$[b] |
| B | 0.55 |
| C | 0.52 |

| Ink | Drying Time (seconds)[a] |
|---|---|
| D | 0.52 |

[a] 20 μL normalized to 100 pL, felt side of paper
[b] error estimated from two runs Other embodiments and modifications of the present invention may occur to those skilled in the art subsequent to a review of the information presented herein; these embodiments and modifications, as well as equivalents thereof, are also included within the scope of this invention.

What is claimed is:

1. An ink composition consisting essentially of water, diethylene glycol-monobutyl ether, glycerol, an optional cyclohexyl pyrrolidinone component, a dye selected from the group consisting of dyes containing dansyl chromophores and dyes containing porphyrin chromophores, an optional biocide, and an optional polyalkylene oxide additive.

2. An ink composition according to claim 1 wherein diethylene glycol-monobutyl ether is present in an amount of from about 4 to about 15 percent by weight, glycerol is present in an amount of from about 2 to about 12 percent by weight, cyclohexyl pyrrolidinone is present in an amount of from 0 to about 10 percent by weight, and the dye is present in an amount of from about 0.01 to about 4 percent by weight.

3. An ink composition according to claim 1 wherein water is present in an amount of from about 65 to about 90 percent by weight, diethylene glycol-monobutyl ether is present in an amount of from about 6 to about 12 percent by weight, glycerol is present in an amount of from about 2 to about 8 percent by weight, cyclohexyl pyrrolidinone is present in an amount of from about 1 to about 5 percent by weight, and the dye is present in an amount of from about 0.01 to about 2 percent by weight.

4. An ink composition according to claim 1 wherein the polyalkylene oxide additive is of the formula wherein $R^1$ and $R^2$ are independently selected from the group consisting of hydrogen, alkyl groups with from 1 to about 8 carbon atoms, and alkoxy groups with from 1 to about 8 carbon atoms, $R^3$ and $R^4$ are independently selected from the group consisting of alkyl groups with from 1 to about 4 carbon atoms, and x and y are each independently a number of from about 100 to about 400.

5. An ink composition according to claim 1 wherein the ink has a viscosity of from about 1.05 to about 10 centipoise at 25° C.

6. An ink composition according to claim 1 wherein the ink has a surface tension of from about 28 to about 35 dynes per centimeter.

7. An ink composition according to claim 1 wherein the ink exhibits a drying time of less than about 1 second on plain paper.

8. An ink composition according to claim 1 wherein the dye is selected from the group consisting of 5,10,15,20-tetrakis-(1-methyl-4-pyridyl)-21H,23H-porphine tetra-p-tosylate salt; 5,10,15,20-tetrakis-(1-methyl-4-pyridyl)-21H,23H-porphine tetrachloride salt; 5,10,15,20-tetrakis-(1-methyl-4-pyridyl)-21H,23H-porphine tetrabromide salt; 5,10,15,20-tetrakis-(1-methyl-4-pyridyl)-21H,23H-porphine tetra-acetate salt; 5,10,15,20-tetrakis-(1-methyl-4-pyridyl)-21H,23H-porphine tetra-perchlorate salt; 5,10,15,20-tetrakis-(1-methyl-4-pyridyl)-21H,23H-porphine tetrafluoroborate salt; 5,10,15,20-tetrakis-(1-methyl-4-pyridyl)-21H,23H-porphine tetra-perchlorate salt; 5,10,15,20-tetrakis-(1-methyl-4-pyridyl)-21H,23H-porphine tetra-triflate salt; 5,10,15,20-tetrakis-(1-hydroxymethyl-4-pyridyl)-21H,23H-porphine tetra-p-tosylate salt; 5,10,15,20-tetrakis-[1-(2-hydroxyethyl)-4-pyridyl]-21H,23H-porphine tetrachloride salt; 5,10,15,20-tetrakis-[1-(3-hydroxypropyl)-4-pyridyl]-21H,23H-porphine tetra-p-tosylate salt; 5,10,15,20-tetrakis-[1-(2-hydroxypropyl)-4-pyridyl]-21H,23H-porphine tetra-p-tosylate salt; 5,10,15,20-tetrakis-[1-(2-hydroxyethoxyethyl)-4-pyridyl]-21H,23H-porphine tetra-p-tosylate salt; 5,10,15,20-tetrakis-[1-(2-hydroxyethoxypropyl)-4-pyridyl]-21H,23H-porphine tetra-p-tosylate salt; 5,10,15,20-tetrakis-[4-(trimethylammonio)phenyl]-21H,23H-porphine tetra-p-tosylate salt; 5,10,15,20-tetrakis-[4-(trimethylammonio)phenyl]-21H,23H-porphine tetrachloride salt; 5,10,15,20-tetrakis-[4-(trimethylammonio)phenyl]-21H,23H-porphine tetrabromide salt; 5,10,15,20-tetrakis-[4-(trimethylammonio)phenyl]-21H,23H-porphine tetra-acetate salt; 5,10,15,20-tetrakis-[4-(trimethylammonio)phenyl]-21H,23H-porphine tetra-perchlorate salt; 5,10,15,20-tetrakis-[4-(trimethylammonio)phenyl]-21H,23H-porphine tetrafluoroborate salt; 5,10,15,20-tetrakis-[4-(trimethylammonio)phenyl]-21H,23H-porphine tetra-triflate salt; meso-(N-methyl-X-pyridinium)$_n$-(phenyl)4-n-21H,23H-porphine tetra-p-tosylate salt, where n is an integer of value 0, 1, 2, or 3, and where X=4-(para), 3-(meta), or 2-(ortho) and refers to the position of the nitrogen in the pyridinium substituent; meso-tetrakis-[o-(N-methylnicotinamido)phenyl]-21H,23H-porphine tetra-methyl sulfonate salt; 5,10,15,20-tetrakis-(2-sulfonatoethyl-4-pyridyl)-21H,23H-porphine chloride salt; 5,10,15,20-tetrakis-(carboxymethyl-4-pyridyl)-21H,23H-porphine chloride salt; 5,10,15,20-tetrakis-(carboxyethyl-4-pyridyl)-21H,23H-porphine chloride salt; 5,10,15,20-tetrakis-(carboxyethyl-4-pyridyl)-21H,23H-porphine bromide salt; 5,10,15,20-tetrakis-(carboxylate-4-pyridyl)-21H,23H-porphine bromide salt; 2,3,7,8,12,13,17,18-octa-(2-hydroxyethyl)-21H-23H-porphine; 2,3,7,8,12,13,17,18-octa-(2-hydroxyethoxyethyl)-21H-23H-porphine; 2,3,7,8,12,13,17,18-octa-(2-aminoethyl)-21H-23H-porphine; 2,3,7,8,12,13,17,18-octa-(2-hydroxyethoxypropyl)-21H-23H-porphine; and mixtures thereof.

9. An ink composition according to claim 1 wherein the dye is selected from the group consisting of dansyl-L-alanine; Dansyl-L-α-amino-n-butyric acid; α-dansyl-L-arginine; dansyl-L-asparagine; dansyl-L-aspartic acid; dansyl-L-cysteic acid; N,N'-didansyl-L-cystine; dansyl-L-glutamic acid; dansyl-L-glutamine; N-dansyl-trans-4-hydroxy-L-proline; dansyl-L-isoleucine; dansyl-L-leucine; di-dansyl-L-lysine; N-ε-dansyl-L-lysine; dansyl-L-methionine; dansyl-L-norvaline; dansyl-L-phenylalanine; dansyl-L-proline; N-dansyl-L-serine; N-dansyl-L-threonine; Nα-dansyl-L-tryptophan; N,O-di-dansyl-L-tyrosine monocyclohexylammonium salt; dansyl-L-valine; dansyl-γ-amino-n-butyric acid; dansyl-DL-α-amino-n-butyric acid; dansyl-DL-aspartic acid; dansyl-DL-glutamic acid; dansylglycine; dansyl-DL- leucine; dansyl-DL-methionine; dansyl-DL-norleucine; dansyl-DL-norvaline; dansyl-DL-phenylalanine; dansylsarcosine; N-dansyl-DL-serine; N-dansyl-DL-threonine; Nα-dansyl-DL-tryptophan; dansyl-DL-valine; dansyl-DL-α-aminocaprylic acid cyclohexylamine salt; (dansylaminoethyl)-trimethylammonium perchlorate; didansylcadaverine; monodansylcadaverine; dansylputrescine; dansylspermidine; didansyl-1,4-diaminobutane; didansyl-1,3-diamino-propane; didansylhistamine; and mixtures thereof.

10. A process which comprises incorporating into an ink jet printer an ink composition consisting essentially of water, diethylene glycol-monobutyl ether, glycerol, an optional cyclohexyl pyrrolidinone component, a dye selected from the group consisting of dyes containing dansyl chromophores and dyes containing porphyrin chromophores, an optional biocide, and an optional polyalkylene oxide additive, and causing droplets of the ink composition to be ejected in an imagewise pattern onto a substrate.

11. A process according to claim 10 wherein diethylene glycol-monobutyl ether is present in an amount of from about 4 to about 15 percent by weight, glycerol is present in an amount of from about 2 to about 12 percent by weight, cyclohexyl pyrrolidinone is present in an amount of from 0 to about 10 percent by weight, and the dye is present in an amount of from about 0.01 to about 4 percent by weight.

12. A process according to claim 10 wherein water is present in an amount of from about 65 to about 90 percent by weight, diethylene glycol-monobutyl ether is present in an amount of from about 6 to about 12 percent by weight, glycerol is present in an amount of from about 2 to about 8 percent by weight, cyclohexyl pyrrolidinone is present in an amount of from about 1 to about 5 percent by weight, and the dye is present in an amount of from about 0.01 to about 2 percent by weight.

13. A process according to claim 10 wherein the polyalkylene oxide additive is of the formula wherein $R^1$ and $R^2$ are independently selected from the group consisting of hydrogen, alkyl groups with from 1 to about 8 carbon atoms, and alkoxy groups with from 1 to about 8 carbon atoms, $R^3$ and $R^4$ are independently selected from the group consisting of alkyl groups with from 1 to about 4 carbon atoms, and x and y are each independently a number of from about 100 to about 400.

14. A process according to claim 10 wherein the ink has a viscosity of from about 1.05 to about 10 centipoise at 25° C.

15. A process according to claim 10 wherein the ink has a surface tension of from about 28 to about 35 dynes per centimeter.

16. A process according to claim 10 wherein the ink exhibits a drying time of less than about 1 second on plain paper.

17. A process according to claim 10 wherein the dye is selected from the group consisting of 5,10,15,20-tetrakis-(1-methyl-4-pyridyl)-21H,23H-porphine tetra-p-tosylate salt; 5,10,15,20-tetrakis-(1-methyl-4-pyridyl)-21H,23H-porphine tetrachloride salt; 5,10,15,20-tetrakis-(1-methyl-4-pyridyl)-21H,23H-porphine tetrabromide salt; 5,10,15,20-tetrakis-(1-methyl-4-pyridyl)-21H,23H-porphine tetra-acetate salt; 5,10,15,20-tetrakis-(1-methyl-4-pyridyl)-21H,23H-porphine tetra-perchlorate salt; 5,10,15,20-tetrakis-(1-methyl-4-pyridyl)-21H,23H-porphine tetrafluoroborate salt; 5,10,15,20-tetrakis-(1-methyl-4-pyridyl)-21H,23H-porphine tetra-perchlorate salt; 5,10,15,20-tetrakis-(1-methyl-4-pyridyl)-21H,23H-porphine tetra-triflate salt; 5,10,15,20-tetrakis-(1-hydroxymethyl-4-pyridyl)-21H,23H-porphine tetra-p-tosylate salt; 5,10,15,20-tetrakis-[1-(2-hydroxyethyl)-4-pyridyl]-21H,23H-porphine tetrachloride salt; 5,10,15,20-tetrakis-[1-(3-hydroxypropyl)-4-pyridyl]-21H,23H-porphine tetra-p-tosylate salt; 5,10,15,20-tetrakis-[1-(2-hydroxypropyl)-4-pyridyl]-21H,23H-porphine tetra-p-tosylate salt; 5,10,15,20-tetrakis-[1-(2-hydroxyethoxyethyl)-4-pyridyl]-21H,23H-porphine tetra-p-tosylate salt; 5,10,15,20-tetrakis-[1-(2-hydroxyethoxypropyl)-4-pyridyl]-21H,23H-porphine tetra-p-tosylate salt; 5,10,15,20-tetrakis-[4-(trimethylammonio)phenyl]-21H,23H-porphine tetra-p-tosylate salt; 5,10,15,20-tetrakis-[4-(trimethylammonio)phenyl]-21H,23H-porphine tetrachloride salt; 5,10,15,20-tetrakis-[4-(trimethylammonio)phenyl]-21H,23H-porphine tetrabromide salt; 5,10,15,20-tetrakis-[4-(trimethylammonio)phenyl]-21H,23H-porphine tetra-acetate salt; 5,10,15,20-tetrakis-[4-(trimethylammonio)phenyl]-21H,23H-porphine tetra-perchlorate salt; 5,10,15,20-tetrakis-[4-(trimethylammonio)phenyl]-21H,23H-porphine tetrafluoroborate salt; 5,10,15,20-tetrakis-[4-(trimethylammonio)phenyl]-21H,23H-porphine tetra-triflate salt; meso-(N-methyl-X-pyridinium)$_n$-(phenyl)4-n-21H,23H-porphine tetra-p-tosylate salt, where n is an integer of value 0, 1, 2, or 3, and where X=4-(para), 3-(meta), or 2-(ortho) and refers to the position of the nitrogen in the pyridinium substituent; meso-tetrakis-[o-(N-methylnicotinamido)phenyl]-21H,23H-porphine tetra-methyl sulfonate salt; 5,10,15,20-tetrakis-(2-sulfonatoethyl-4-pyridyl)-21H,23H-porphine chloride salt; 5,10,15,20-tetrakis-(carboxymethyl-4-pyridyl)-21H,23H-porphine chloride salt; 5,10,15,20-tetrakis-(carboxyethyl-4-pyridyl)-21H,23H-porphine chloride salt; 5,10,15,20-tetrakis-(carboxyethyl-4-pyridyl)-21H,23H-porphine bromide salt; 5,10,15,20-tetrakis-(carboxylate-4-pyridyl)-21H,23H-porphine bromide salt; 2,3,7,8,12,13,17,18-octa-(2-hydroxyethyl)-21H-23H-porphine; 2,3,7,8,12,13,17,18-octa-(2-hydroxyethoxyethyl)-21H-23H-porphine; 2,3,7,8,12,13,17,18-octa-(2-aminoethyl)-21H-23H-porphine; 2,3,7,8,12,13,17,18-octa-(2-hydroxyethoxypropyl)-21H-23H-porphine; and mixtures thereof.

18. A process according to claim 10 wherein the dye is selected from the group consisting of dansyl-L-alanine; Dansyl-L-α-amino-n-butyric acid; α-dansyl-L-arginine; dansyl-L-asparagine; dansyl-L-aspartic acid; dansyl-L-cysteic acid; N,N'-di-dansyl-L-cystine; dansyl-L-glutamic acid; dansyl-L-glutamine; N-dansyl-trans-4-hydroxy-L-proline; dansyl-L-isoleucine; dansyl-L-leucine; di-dansyl-L-lysine; N-ε-dansyl-L-lysine; dansyl-L-methionine; dansyl-L-norvaline; dansyl-L-phenylalanine; dansyl-L-proline; N-dansyl-L-serine; N-dansyl-L-threonine; Nα-dansyl-L-tryptophan; N,O-di-dansyl-L-tyrosine monocyclohexylammonium salt; dansyl-L-valine; dansyl-γ-amino-n-butyric acid; dansyl-DL-α-amino-n-butyric acid; dansyl-DL-aspartic acid; dansyl-DL-glutamic acid; dansylglycine; dansyl-DL-leucine; dansyl-DL-methionine; dansyl-DL-norleucine; dansyl-DL-norvaline; dansyl-DL-phenylalanine; dansylsarcosine; N-dansyl-DL-serine; N-dansyl-DL-threonine; Nα-dansyl-DL-tryptophan; dansyl-DL-valine; dansyl-DL-α-aminocaprylic acid cyclohexylamine salt; (dansylaminoethyl)-trimethylammonium perchlorate; didansylcadaverine; monodansylcadaverine; dansylputrescine; dansylspermidine; didansyl-1,4-diaminobutane; didansyl-1,3-diamino-propane; didansylhistamine; and mixtures thereof.

* * * * *